(12) United States Patent
Wan et al.

(10) Patent No.: US 10,988,397 B2
(45) Date of Patent: Apr. 27, 2021

(54) INTEGRATED GREENING DEVICE AND METHOD FOR RECYCLING WASTEWATER

(71) Applicant: XI'AN UNIVERSITY OF SCIENCE AND TECHNOLOGY, Xi'an (CN)

(72) Inventors: Qiong Wan, Xi'an (CN); Zhiyan Li, Xi'an (CN); Xuhui Zhou, Xi'an (CN); Li Zhang, Xi'an (CN); Liu Yu, Xi'an (CN); Kai Wang, Xi'an (CN); Tiening Xue, Xi'an (CN); Xinyan Zhang, Xi'an (CN); Kai Ju, Xi'an (CN); Shuancheng Gu, Xi'an (CN)

(73) Assignee: XI'AN UNIVERSITY OF SCIENCE AND TECHNOLOGY, Xi'an (CN)

( * ) Notice: Subject to any disclaimer, the term of this patent is extended or adjusted under 35 U.S.C. 154(b) by 0 days.

(21) Appl. No.: 16/747,672

(22) Filed: Jan. 21, 2020

(65) Prior Publication Data
US 2020/0239345 A1 Jul. 30, 2020

(30) Foreign Application Priority Data
Jan. 28, 2019 (CN) .......................... 201910081273.6

(51) Int. Cl.
*C02F 9/00* (2006.01)
*C02F 3/32* (2006.01)
(Continued)

(52) U.S. Cl.
CPC ................ *C02F 9/00* (2013.01); *C02F 1/004* (2013.01); *C02F 1/281* (2013.01); *C02F 1/325* (2013.01);
(Continued)

(58) Field of Classification Search
CPC .... C02F 9/00; C02F 3/327; C02F 3/06; C02F 2003/001; C02F 1/004; C02F 2303/04;
(Continued)

(56) References Cited

U.S. PATENT DOCUMENTS

| 5,736,047 A * | 4/1998 | Ngo ...................... C02F 3/1263 |
| | | 210/602 |
| 6,277,274 B1 * | 8/2001 | Coffman .............. B01D 24/205 |
| | | 210/150 |

(Continued)

FOREIGN PATENT DOCUMENTS

FR 2889518 A1 * 2/2007

*Primary Examiner* — Fred Prince
(74) *Attorney, Agent, or Firm* — Tutunjian & Bitetto, P.C.

(57) ABSTRACT

The present invention discloses a small integrated greening device and method for recycling wastewater, including a wastewater collection system, a microorganism and plant purification system, and a reclaimed water collection and distribution system. The method includes the following process: greywater or wastewater is collected through a pipeline and enters a water collection tank of a wastewater collection part. Lifting is performed by submersible sewage pumps, such that the lifted water enters a microorganism and plant synergistic purification and greening part. Each submersible pump is controlled by one corresponding automatic water level controller to transport the treated water to the reclaimed water-use sites. The device and method provided by the present invention utilize the physical and chemical action of a filler and the synergistic purification effect of microorganisms and plants to purify the greywater, and the purified reclaimed water is used for flushing toilets, watering trees or other purposes.

18 Claims, 2 Drawing Sheets

(51) Int. Cl.
*C02F 3/06* (2006.01)
*C02F 1/00* (2006.01)
*C02F 1/32* (2006.01)
*C02F 1/28* (2006.01)
C02F 3/00 (2006.01)
C02F 101/10 (2006.01)
C02F 103/00 (2006.01)

(52) U.S. Cl.
CPC ............... *C02F 3/06* (2013.01); *C02F 3/327* (2013.01); *C02F 2003/001* (2013.01); *C02F 2101/105* (2013.01); *C02F 2103/002* (2013.01); *C02F 2301/08* (2013.01); *C02F 2303/04* (2013.01)

(58) Field of Classification Search
CPC ............... C02F 1/325; C02F 2101/105; C02F 2103/002; C02F 2301/08; C02F 1/281
USPC ....... 210/602, 615, 616, 617, 150, 151, 252, 210/259, 74.1, 748.1, 748.11
See application file for complete search history.

(56) References Cited

U.S. PATENT DOCUMENTS

| | | | |
|---|---|---|---|
| 2013/0048557 A1* | 2/2013 | Kent | C02F 3/327 |
| | | | 210/602 |
| 2014/0124420 A1* | 5/2014 | Kim | C02F 3/327 |
| | | | 210/96.1 |
| 2018/0057379 A1* | 3/2018 | Upadhyay | C02F 3/327 |

* cited by examiner

INTEGRATED GREENING DEVICE AND METHOD FOR RECYCLING WASTEWATER

TECHNICAL FIELD

The present invention relates to the field of sewage/wastewater recycling and environmental protection technologies, and particularly to a small integrated greening device and method for recycling wastewater. The device is installed inside and outside civil buildings or industrial buildings.

BACKGROUND

With the development of economy and the shortage of water resources, the recycling of sewage and wastewater has gained widespread concern. Currently, most of greywater inside and outside civil and industrial buildings are directly discharged into municipal sewer networks, and finally are directly discharged after being treated by urban sewage treatment plants. In this case, water resources are not fully utilized. The reasons are as follows: most water recycling technologies on the market require a large amount of land area, and have complicated operation and maintenance, and high cost; in case of improper treatment, the sewage may be further corroded and emit odors to pollute the environment, incompatible with the environment.

Various greywater can be reused after certain treatment to effectively save water. Based on the physical and chemical action of fillers and the synergistic purification effect of microorganisms and plants, the functional filler and plants are used in a water recycling system in civil and industrial buildings, to achieve the dual purpose of sewage recycling and environmental protection.

SUMMARY

With respect to the deficiencies of the prior art, the present invention provides a small integrated greening device for recycling wastewater that is installed inside and outside civil buildings or industrial buildings. The device has simple operation, low cost, is easy to implement, and has strong practicability. The device can be adjusted according to the size and shape of the specific implementation site, and the functional filler and the greening plants can be combined to achieve the dual purpose of sewage recycling and environmental protection. The present invention is achieved by the following technical solutions.

The small integrated greening device for recycling wastewater includes a wastewater collection system, a microorganism and plant purification system, and a reclaimed water collection and distribution system.

The wastewater collection system is provided with a main water collection pipe, a hair collector, and a wastewater collection tank that are sequentially connected, and the wastewater is lifted to the microorganism and plant purification system by a submersible sewage pump. The microorganism and plant purification system includes a supporting layer, a functional filler layer, and greening plants that are disposed in the wastewater collection tank, and is divided into a plurality of purifying areas through several deflecting partition plates that are staggered and parallel-distributed. The microorganism and plant purification system is connected to the reclaimed water collection and distribution system, the reclaimed water collection and distribution system is provided with an ultraviolet sterilizer, and purified wastewater is transported to each reclaimed water-use site for flushing toilets, watering trees or recycling through a water distribution pipeline.

The following further explains the technical solutions of the present invention.

The main water collection pipe for collecting wastewater is connected to the hair collector, and the hair collector is connected to the wastewater collection tank. The wastewater collection tank is provided with a first submersible sewage pump, a water outlet pipe, an exhaust pipe, an overflow pipe, and a liquid level controller.

A pipeline, connected to the wastewater collection tank, of the hair collector is inclined by 5-10°.

The supporting layer, the functional filler layer, and the greening plants are sequentially arranged from bottom to top in the microorganism and plant purification system, and a large-hole perforated pipe is embedded in the supporting layer.

The supporting layer is made of gravel or a filter supporting layer material, and the height of the supporting layer is 5-10 cm.

The functional filler layer is filled with ceramsite functional fillers, and the height of the functional filler layer is 40-60 cm.

The aquatic flowers and greening plants are planted in the functional filler layer, and root systems of the greening plants penetrate into the functional filler layer for 10-20 cm.

The supporting layer, the functional filler layer, and the greening plants are supported by a water-permeable partition plate, and the height from the water-permeable partition plate to the bottom of the water collection area is 5-8 cm.

Any two adjacent deflecting partition plates that are staggered and parallel-distributed are alternately arranged up and down, the top surface of an upper partition plate is arranged on the upper edge of the microorganism and plant synergistic purification system, and the top surface of a lower partition plate is arranged on top of the functional filler layer. The bottom of the upper partition plate is arranged at the bottom of the water-permeable partition plate, and the bottom of the lower partition plate is arranged at the bottom of the microorganism and plant synergistic purification system. A distance between adjacent deflecting partition plates is not greater than 20 cm.

The functional filler of the functional filler layer is manufactured by the following method:

1) taking aluminum sludge with a moisture content of 65-75% from a water purification plant, and making the aluminum sludge into spherical particles with a diameter of 5-10 mm through a granulator;

2) naturally drying the spherical particles in step 1) in the air until the moisture content is reduced to 50%; and 3) placing the spherical aluminum sludge after drying in step 2) in an oven at 180-200° C. for baking 16-20 hours, to obtain a functional filler.

The ultraviolet sterilizer in the reclaimed water collection and distribution system is placed obliquely with respect to a vertical direction of the deflecting partition plate. The reclaimed water collection and distribution system is respectively provided with a second submersible sewage pump, a water outlet pipeline, and an overflow pipeline.

The present invention further provides an integrated greening method for recycling wastewater by using the above device, including the following steps:

1) wastewater collected by a main water collection pipe is regularly cleaned through a hair filter, then the wastewater is transported to a wastewater collection tank, and the wastewater is pumped into a microorganism and plant purification system at a set flow rate by a metering pump;

2) the wastewater that enters the microorganism and plant purification system is aerated in the system by a large-hole perforated pipe at an aeration rate where dissolved oxygen concentration of the system is 2 mg/L, goes through the supporting later and the functional filler to remove phosphorous, and then purified by microorganism and greening plants to remove other pollutants;

3) the wastewater flows through the water inlet pipeline to the functional filler layer, the supporting layer, and the water-permeable partition plate, and flows back and forth to several purifying areas through several deflecting partition plates that are staggered and parallel-distributed; and 4) purified wastewater enters the reclaimed water collection and distribution system and is disinfected by an ultraviolet sterilizer, and then the purified wastewater is transported to each reclaimed water-use site for flushing toilets, watering trees or recycling through a water distribution pipeline.

By means of the foregoing technical solution, the present invention has the following advantageous effects:

The present invention performs processing on solid waste aluminum sludge from a water treatment plant to transform the aluminum sludge into a functional filler, and utilizes the physical and chemical action of the filler and the synergistic purification effect of microorganisms and plants to purify greywater. The purified reclaimed water is used for flushing toilets, watering trees or other purposes for effectively recycling water and greening water utilization institutions. The main raw material of the functional filler of this system is the solid waste aluminum sludge from the water treatment plant (the water treatment plant is built in each city for continuous production, which ensures the supply reliability and low cost of aluminum sludge), which well realizes the environmental protection concept of treating waste with waste and recycling wastes. The greening plants in the system can be randomly combined and selected on needs, with a wide range of sources and low price, and personalized designs can be achieved according to user needs.

The present invention not only has the function of purifying various greywater, but also is a greening device that can be used to beautify the environment. The device not only achieves the purpose of recycling sewage and wastewater, but also reduces the discharge of solid waste aluminum sludge, and achieves the purposes of energy saving, emission reduction, and environmental protection. This small-scale integrated system for recycling wastewater has easy operation, high reliability, high efficiency and economic feasibility, and has a good application prospect.

BRIEF DESCRIPTION OF DRAWINGS

The accompanying drawings described here are provided for further understanding of the present invention, constitute a part of this application, but do not constitute inappropriate limitations to the present invention. In the figures.

In the figures: 1. a main water collection pipe, 2. a hair collector, 3. a water inlet pipe, 4. a water outlet pipe, 5. a first submersible sewage pump, 6. an exhaust pipe, 7. an overflow pipe, 8. a wastewater collection tank, 9. a first liquid level controller, 10. a water inlet pipeline, 11. a second submersible sewage pump, 12. a water outlet pipeline, 13. an overflow pipeline, 14. a reclaimed water collection area, 15. a water-permeable partition plate, 16. a supporting layer, 17. a functional filler layer, 18. deflecting partition plates, 19. greening plants, 20. a large-hole perforated pipe, 21. an ultraviolet sterilizer, and 22. a second liquid level controller.

DETAILED DESCRIPTION

The present invention is described in detail below with reference to the accompanying drawings and specific embodiments. Exemplary embodiments and description of the present invention are intended to explain the present invention herein, but are not intended to limit the present invention.

Figure 1:
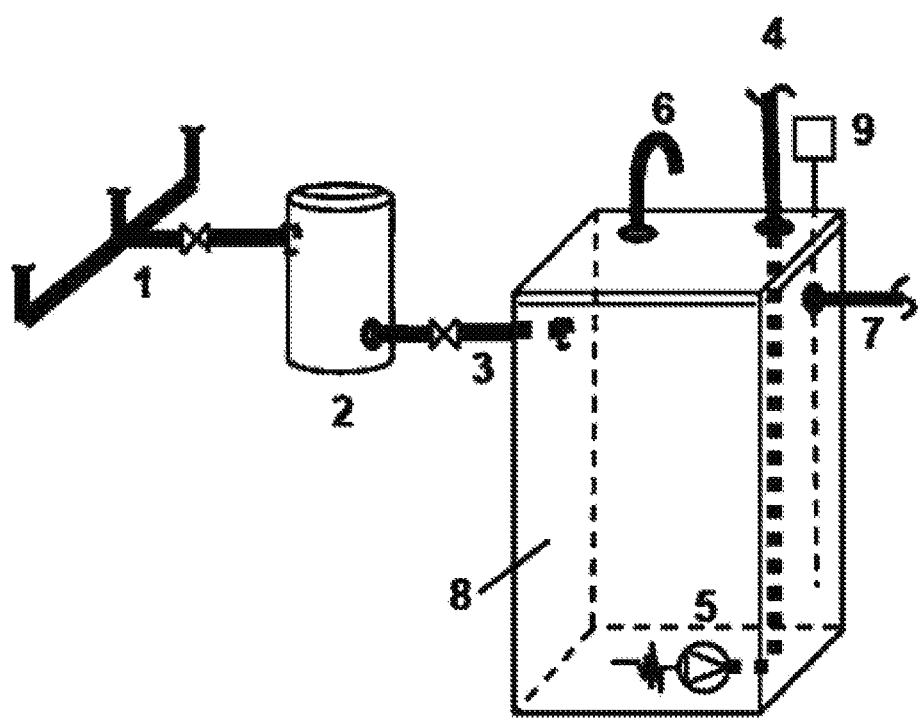
FIG. 1 is a schematic structural diagram of a wastewater collection part.
Figure 2:
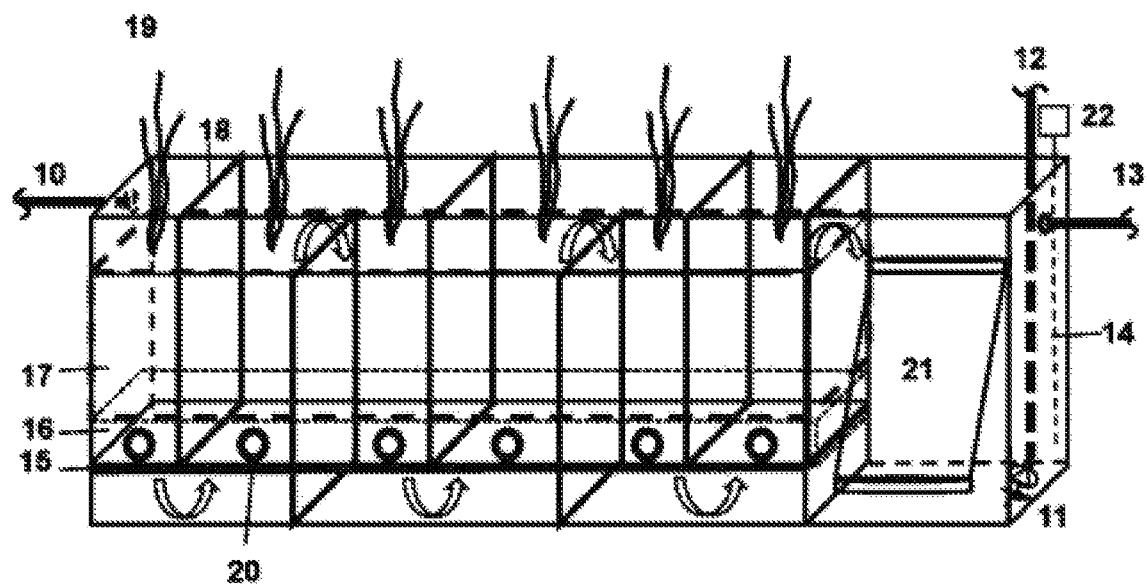
FIG. 2 is a schematic structural diagram of a microorganism and plant synergistic purification and greening part and a reclaimed water collection and disinfection part.

The overall structure of the present invention can be referred to FIG. 1 and FIG. 2. The small integrated greening device for recycling wastewater includes a wastewater collection piping system, a hair collector 2, a first submersible sewage pump 5 and a second submersible sewage pump 11, a vent hole, an overflow pipe 7, a wastewater collection tank 8, a first liquid level controller 9 and a second liquid level controller 22, a water outlet and distribution piping system, an overflow pipeline 13, a reclaimed water collection area 14, a water-permeable partition plate 15, a supporting layer 16, a functional filler layer 17, deflecting partition plates 18, greening plants 19, a large-hole perforated pipe 20, and an ultraviolet sterilizer 21.

The small integrated greening device for recycling wastewater includes a wastewater collection system, a microorganism and plant purification system, and a reclaimed water collection and distribution system. The wastewater collection system is provided with the hair collector 2 and the wastewater collection tank 8 that are connected through the water inlet pipe 3, and the wastewater collection tank 8 is connected to the microorganism and plant purification system. The microorganism and plant purification system includes the supporting layer 16, the functional filler layer 17, and the greening plants 19 that are sequentially arranged from bottom to top in the microorganism and plant purification system, and the large-hole perforated pipe 20 is embedded in the supporting layer 16. The microorganism and plant purification system is divided into a plurality of purifying areas through several deflecting partition plates 18 that are staggered and parallel-distributed. The microorganism and plant purification system is connected to the reclaimed water collection and distribution system. The reclaimed water collection and distribution system is provided with the ultraviolet sterilizer 21, and purified wastewater is transported to each reclaimed water-use site for flushing toilets, watering trees or recycling through a water distribution pipeline.

The system process includes: the wastewater collection part collects greywater from different system sources, and the greywater is transported to the purification part by a pump; the purification of wastewater is achieved through the physical and chemical action of the filler on the wastewater, the synergistic effect of the flowers and plants grown on the filler and the microorganisms inside the filler; and after being collected and sterilized, the purified wastewater is then transported to various reclaimed water-use sites through a water distribution pipeline for flushing toilets, watering trees, recycling, and the like.

The wastewater collection part is mainly composed of a water collection pipe 1, a hair collector 2, a wastewater collection tank 8, and a first submersible sewage pump 5. The microorganism and plant purification part is mainly composed of a reactor box, greening plants 19, a functional filler layer 17, a supporting layer 16, and a large-hole perforated pipe 20. The reclaimed water collection and distribution part is composed of a reclaimed water collection area 14, an ultraviolet sterilizer 21, a water pump, an automatic water level controller, and a water distribution pipeline.

The main water collection pipe 1 for collecting wastewater is connected to the hair collector 2, and the hair collector 2 is connected to the wastewater collection tank 8. A pipeline, connected to the wastewater collection tank 8, of the hair collector 2 is inclined by 5-10°. The wastewater collection tank 8 is provided with a first submersible sewage pump 5, a water outlet pipe 4, an exhaust pipe 6, an overflow pipe 7, and a liquid level controller 9.

The supporting layer 16 is made of gravel or a filter supporting layer material, and the height of the supporting layer is 5-10 cm. The functional filler layer 17 is filled with ceramsite functional fillers, and the height of the functional filler layer is 40-60 cm. The aquatic flowers and greening plants 19 are planted in the functional filler layer 17, and root systems of the greening plants penetrate into the functional filler layer for 10-20 cm. The supporting layer 16, the functional filler layer 17, and the greening plants 19 are supported by a water-permeable partition plate 15, and the height from the water-permeable partition plate 15 to the bottom of the water collection area 14 is 5-8 cm.

The functional filler of the functional filler layer 17 is manufactured by the following method:

1) taking aluminum sludge with a moisture content of 65-75% from a water purification plant, and making the aluminum sludge into spherical particles with a diameter of 5-10 mm through a granulator;

2) naturally drying the spherical particles in step 1) in the air until the moisture content is reduced to 50%; and 3) placing the spherical aluminum sludge after drying in step 2) in an oven at 180-200° C. for baking 16-20 hours, to obtain a functional filler.

Any two adjacent deflecting partition plates 18 that are staggered and parallel-distributed are alternately arranged up and down, the top surface of an upper partition plate is arranged on the upper edge of the microorganism and plant synergistic purification system, and the top surface of a lower partition plate is arranged on top of the functional filler layer 17. The bottom of the upper partition plate is arranged at the bottom of the water-permeable partition plate 15, and the bottom of the lower partition plate is arranged at the bottom of the microorganism and plant synergistic purification system.

The ultraviolet sterilizer 21 in the reclaimed water collection and distribution system is placed obliquely with respect to a vertical direction of the deflecting partition plate 18. The reclaimed water collection and distribution system is respectively provided with a second submersible sewage pump 11, a water outlet pipeline 12, and an overflow pipeline 13.

In the present invention, various greywater is collected and is connected to the wastewater collection tank through a piping system. A hair collector is required to be installed on a main pipe so that the hair in the wastewater can be removed before entering the wastewater collection tank, and the hair collector is regularly cleaned (the cleaning cycle depends on specific water quality conditions). The wastewater in the wastewater collection tank enters the subsequent biological treatment and greening part through the submersible sewage pump. The start or stop of the submersible sewage pump is controlled by the liquid level controller.

The wastewater collection tank is provided with an air pipe and an overflow pipe. When the wastewater flow is too large, the wastewater is discharged to the domestic sewage pipe network through the overflow pipe, to ensure the safe operation of the equipment. The overflow pipe is connected to the drainage pipe inside and outside the civil or industrial buildings. Both the water collection tank and the piping system can be made of PVC or metal. The water collection tank in the community can be made of glass fiber reinforced plastics, metal, integrated plastic products, or concrete. The materials used in the piping system are the same as those of the outdoor drainage system. The shape and size of the water collection tank need to be adjusted randomly according to actual engineering requirements. A certain gradient (about 2‰) is set for the water collection pipe to facilitate the wastewater flowing into the wastewater collection tank 8. The wastewater collection tank 8 is provided with an access hole. The volume of the water collection tank can ensure the operation requirements of the water pump. The overflow pipe is arranged below the water inlet pipe, and a height difference thereof should be at least two times the diameter of the water inlet pipe; the diameter of the overflow pipe is greater than or equal to the diameter of the water inlet pipe. The overflow pipe 7 and the exhaust pipe 6 are both connected to the building drainage pipe. A check valve and a metering pump are arranged on the water outlet pipe 4 of the wastewater collection tank 8, and the metering pump is used to pump the wastewater into the subsequent purification part at a set flow rate. The flow needs to be determined according to the requirements of wastewater quality and reclaimed water quality.

FIG. 2 shows a biological treatment and greening part and a reclaimed water collection and disinfection part. The wastewater is transported from the water collection tank to the biological treatment part by the submersible sewage pump. The biological treatment part is in staggered separation by the staggered deflecting partition plates along the direction of water flow. The clear distance between the deflecting partition plates should not be greater than 20 cm. The wastewater first enters a first compartment of the biological treatment part for water distribution and begins the wastewater treatment process. After that, the water flow is guided by the deflecting partition plates to flow vertically up and down in the filler along the axial direction of the equipment. Water flows through the last compartment to the water collection area. After disinfection in the water collection area, the water is distributed to the water-use site by the pump, and the excess water is discharged to the rainwater pipeline through the overflow pipe.

The volume of the biological treatment part needs to be determined according to the amount of wastewater, and the hydraulic retention time should be ensured for 12 hours. The water-permeable partition plate in the integrated system can be a perforated plastic plate, a perforated metal plate or a water-permeable concrete structure. The filler supporting layer is made of pebble or plastic particles with a diameter equal to twice the particle diameter of the functional filler. In one embodiment, gravel or other supporting materials with a particle size of about 1 cm may be used. The filler needs to be reasonably proportioned according to the quality of the treated water. The main material of the filler is functional ceramsite that are produced by firing aluminum sludge from a water supply plant, and the particle size is 5-10 mm.

The aquatic flowers and greening plants are planted in the functional filler layer 17 of the purification part, and after long-term culture, root systems of the greening plants penetrate into the functional filler layer for 10-20 cm. All kinds of aquatic flowers and plants with developed root systems are available. Users can make selection and cultivation according to their personal preferences and requirements. Most of them are common root-developed hydrophilic greening plants. The dimensions of this part in the depth direction need to strictly conform to the given dimensions, and the horizontal section has no fixed shape, and can be randomly designed and adjusted according to the space and greening requirements of the application site.

The thickness of the supporting layer is 5-10 cm, and the thickness of the filler layer is 40-60 cm. The distance above the filler layer is 15 cm. The thickness and height can be designed and adjusted according to actual conditions. A large-hole perforated pipe is arranged inside the supporting layer to perform even gas distribution on the purification part. The large-hole perforated pipe is arranged under the filler layer or inside the supporting layer, and an aerator is installed outside the reactor. After being treated by the biological treatment part, the wastewater overflows to the reclaimed water collection area for UV disinfection, and is finally transported to various water-use sites through the submersible sewage pumps and piping systems. The shape and size of the reactor box need to be designed on-site according to the space requirements of the application site, and the material may be plastic or metal. The volume of the reclaimed water collection area needs to be determined according to the amount of reclaimed water. The excess water is discharged into the rainwater system of civil or industrial buildings through the overflow pipe. The disinfection uses ultraviolet disinfection. The start or stop of the submersible sewage pump is controlled by the liquid level controller.

The shape of the integrated device can be flexibly changed according to the setting environment. There are no strict requirements on greening plant species, and greening plants can be selected according to the greening needs of the construction party to beautify the environment while treating wastewater.

The following describes an integrated greening method for recycling wastewater of the present invention, including the following steps:

1) water collection pipes (the material of the pipe is the same as that of the conventional drainage system) are set in various greywater (including the wastewater from washbasin, shower and washing machines and other greywater) places according to the site conditions to collect wastewater, the wastewater collected by the main water collection pipe 1 is regularly cleaned through a hair filter 2, then the wastewater is transported to the wastewater collection tank 8, and the wastewater is pumped into the microorganism and plant purification system at a set flow rate by the metering pump, where the flow needs to be determined according to the requirements of wastewater quality and reclaimed water quality.

2) the wastewater that enters the microorganism and plant purification system is aerated in the system by a large-hole perforated pipe 20 at an aeration rate where dissolved oxygen concentration of the system is 2 mg/L, the wastewater penetrates the supporting layer 16 to fill the functional filler layer 17, so as to provide a growth place for the microorganism and greening plants 19 and to remove phosphorous in sewage through the physical and chemical action, and at the same time, the greening plants 19 achieve synergistic purification to remove pollutants in the sewage; and the greening plants 19 herein can fully play a synergistic purification function to remove pollutants in the sewage.

3) the treated wastewater flows through the water inlet pipeline 10, enters the functional filler layer 17 and the supporting layer 16, reaches the water-permeable partition plate 15, and flows back and forth to several purifying areas through several deflecting partition plates 18 that are staggered and parallel-distributed.

There are strict requirements in terms of depth, that is, the height of the supporting layer is 5-10 cm, and the height of the filler layer is 40-60 cm. In terms of plane dimension, the purification device can be adjusted and designed according to the specific service setting space. The bottom perforated plate (either plastic or metal) can provide support for the supporting layer and the filler layer, and can collect the to-be-treated water. The water inlet liquid level is 0-5 cm higher than the filler layer. The height of the bottom water collection area is 5 cm. The treated wastewater flows through the water inlet liquid level, the filler layer, the supporting layer, the support layer and the water collection area, and finally, the wastewater is discharged to the reclaimed water collection tank through the drainage pipeline.

4) purified wastewater enters the reclaimed water collection and distribution system, effluent from biological purification is disinfected by the ultraviolet sterilizer 21 and then the purified wastewater is transported to each reclaimed water-use site by the second submersible sewage pump 11 for flushing toilets, watering trees or recycling through a water distribution pipeline. The reclaimed water collection tank is provided with an ultraviolet lamp and the second submersible sewage pump 11, and an automatic water level controller is built in the reclaimed water collection tank and is connected to the second submersible sewage pump 11. The effluent from biological purification is disinfected by the ultraviolet sterilizer 21. For toilets, the disinfected water is controlled by the second liquid level controller 22 and transported to the toilet tank by the submersible pump for flushing toilets. When the water for toilet-flushing is insufficient, the residential water distribution system supplements the remaining water, and when there is excessive reclaimed water, the excessive reclaimed water is discharged to the residential rainwater system through the rainwater drainage system. For residential quarters or industrial water-use sites, the disinfected water is flexibly transported and controlled according to the community water planning or industrial water requirements.

The basic principles, main features, specific methods, and advantages of the present invention have been shown and described above. Those skilled in the art should understand that the present invention is not limited by the foregoing embodiments, and the descriptions in the foregoing embodiments and specification are merely used for illustrating principles of the present invention. Without departing from the spirit and scope of the present invention, the present invention may have various modifications and improvements, and all these modifications and improvements belong to the protection scope of the present invention. The protection scope of the present invention is defined by the appended claims and their equivalents.

The invention claimed is:

1. An integrated greening device for recycling wastewater, comprising:
 a wastewater collection system, a microorganism and plant purification system, and a reclaimed water collection and distribution system, wherein
 the wastewater collection system is provided with a main water collection pipe, a hair collector/filter, and a wastewater collection tank that are sequentially connected, the wastewater is lifted to the microorganism and plant purification system by a submersible sewage pump;

the microorganism and plant purification system comprises a supporting layer, a functional filler layer, and greening plants that are disposed in the wastewater collection tank, and is divided into a plurality of purifying areas through several deflecting partition plates that are staggered and parallel-distributed; and the microorganism and plant purification system is connected to the reclaimed water collection and distribution system, the reclaimed water collection and distribution system is provided with an ultraviolet sterilizer, and purified wastewater is transported to each reclaimed water-use site for flushing toilets, watering trees or recycling through a water distribution pipeline.

2. The integrated greening device for recycling wastewater according to claim 1, wherein the main water collection pipe for collecting wastewater is connected to the hair collector/filter, the hair collector/filter is connected to the wastewater collection tank, and the wastewater collection tank is provided with a first submersible sewage pump, a water outlet pipe, an exhaust pipe, an overflow pipe, and a liquid level controller.

3. The integrated greening device for recycling wastewater according to claim 2, wherein a pipeline, connected to the wastewater collection tank, of the hair collector/filter is inclined by 5-10°.

4. An integrated greening method for recycling wastewater by using the device according to claim 3, comprising:
i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;
iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and
iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

5. An integrated greening method for recycling wastewater by using the device according to claim 2, comprising:
i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;
iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and
iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

6. The integrated greening device for recycling wastewater according to claim 1, wherein the supporting layer, the functional filler layer, and the greening plants are sequentially arranged from bottom to top in the microorganism and plant purification system, and a perforated pipe is embedded in the supporting layer.

7. The small integrated greening device for recycling wastewater according claim 6, wherein the supporting layer is made of gravel or a filter supporting layer material, and a height of the supporting layer is 5-10 cm;
the functional filler layer is filled with ceramsite functional fillers, and a height of the functional filler layer is 40-60 cm; and
the greening plants are planted in the functional filler layer, and root systems of the greening plants penetrate into the functional filler layer for 10-20 cm.

8. An integrated greening method for recycling wastewater by using the device according to claim 7, comprising:
i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;
iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and
iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

9. The integrated greening device for recycling wastewater according to claim 6, wherein the supporting layer, the functional filler layer, and the greening plants are supported by a water-permeable partition plate, and a distance from the water-permeable partition plate to the water collection area at the bottom of the system is 5-8 cm.

10. The integrated greening device for recycling wastewater according to claim 9, wherein the adjacent deflecting partition plates that are staggered and parallel-distributed are alternately arranged up and down, the top surface of an upper partition plate is arranged on the upper edge of the microorganism and plant purification system, and the top surface of a lower partition plate is arranged on top of the functional filler layer;

the bottom of the upper partition plate is arranged at the bottom of the water-permeable partition plate, and the bottom of the lower partition plate is arranged at the bottom of the microorganism and plant purification system; and a distance between adjacent deflecting partition plates is not greater than 20 cm.

11. The small integrated greening device for recycling wastewater according to claim 10, wherein the ultraviolet sterilizer in the reclaimed water collection and distribution system is placed obliquely with respect to a vertical direction of the deflecting partition plate; and the reclaimed water collection and distribution system is respectively provided with a second submersible sewage pump, a water outlet pipeline, and an overflow pipeline.

12. An integrated greening method for recycling wastewater by using the device according to claim 11, comprising:
  i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
  ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;
  iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and
  iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

13. An integrated greening method for recycling wastewater by using the device according to claim 10, comprising:
  i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
  ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;
  iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and
  iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

14. An integrated greening method for recycling wastewater by using the device according to claim 9, comprising:
  i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
  ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;
  iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and
  iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

15. The integrated greening device for recycling wastewater according to claim 6, wherein a functional filler of the functional filler layer is manufactured by the following method:
  i) taking aluminum sludge with a moisture content of 65-75% from a water purification plant, and making the aluminum sludge into spherical particles with a diameter of 5-10 mm through a granulator;
  ii) naturally drying the spherical particles in step i) in the air until the moisture content is reduced to 50%; and
  iii) placing the spherical aluminum sludge after drying in step ii) in an oven at 180-200° C. for baking 16-20 hours, to obtain a functional filler.

16. An integrated greening method for recycling wastewater by using the device according to claim 15, comprising:
  i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;
  ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;

iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

17. An integrated greening method for recycling wastewater by using the device according to claim 6, comprising:

i) collecting wastewater by the main water collection pipe that is regularly cleaned through a hair collector/filter, transporting the collected and hair filtered wastewater to a wastewater collection tank, and pumping the wastewater into the microorganism and plant purification system at a set flow rate by a metering pump;

ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;

iii) the collected wastewater flows through the water inlet pipeline, enters the functional filler layer and the supporting layer, reaches a water-permeable partition plate, and flows back and forth to several purifying areas through several deflecting partition plates that are staggered and parallel-distributed; and iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

18. An integrated greening method for recycling wastewater by using the device according to claim 1, comprising:

i) collecting wastewater by the main water collection pipe that is regularly cleaned through the hair collector/filter, transporting the collected and hair filtered wastewater to a wastewater collection tank, and pumping the wastewater into the microorganism and plant purification system at a set flow rate by a metering pump;

ii) aerating the wastewater that enters the microorganism and plant purification system by a perforated pipe at an aeration rate where dissolved oxygen concentration of the system is 2 mg/L, the wastewater goes through the supporting layer and the functional filler layer and is jointly purified by greening plants to remove pollutants in sewage;

iii) the collected wastewater flows through a water inlet pipeline, enters the functional filler layer and the supporting layer, reaches a water-permeable partition plate, and flows back and forth to several purifying areas through several deflecting partition plates that are staggered and parallel-distributed; and iv) purified wastewater enters the reclaimed water collection and distribution system, effluent from biological purification is disinfected by an ultraviolet sterilizer, and then the purified wastewater is transported to each reclaimed water-use site by a second submersible sewage pump for flushing toilets, watering trees or recycling through the water distribution pipeline.

\* \* \* \* \*

UNITED STATES PATENT AND TRADEMARK OFFICE
CERTIFICATE OF CORRECTION

PATENT NO. : 10,988,397 B2
APPLICATION NO. : 16/747672
DATED : April 27, 2021
INVENTOR(S) : Qiong Wan et al.

Page 1 of 1

It is certified that error appears in the above-identified patent and that said Letters Patent is hereby corrected as shown below:

In the Claims

Column 11, Line 15, Claim 11, delete the word "small".

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*